US012679718B2

(12) United States Patent
Funk

(10) Patent No.: US 12,679,718 B2
(45) Date of Patent: Jul. 14, 2026

(54) BOX SPRING ASSEMBLY SYSTEM

(71) Applicant: Serta Restokraft Mattress Co., Inc., Romulus, MI (US)

(72) Inventor: Steve Funk, Taylor, MI (US)

(73) Assignee: SERTA RESTOKRAFT MATTRESS CO., INC., Romulus, MI (US)

( * ) Notice: Subject to any disclaimer, the term of this patent is extended or adjusted under 35 U.S.C. 154(b) by 0 days.

(21) Appl. No.: 19/184,488

(22) Filed: Apr. 21, 2025

(65) Prior Publication Data

US 2025/0333292 A1 Oct. 30, 2025

Related U.S. Application Data

(60) Provisional application No. 63/638,508, filed on Apr. 25, 2024.

(51) Int. Cl.
*B68G 9/00* (2006.01)
*A47C 23/00* (2006.01)

(52) U.S. Cl.
CPC ................ *B68G 9/00* (2013.01); *A47C 23/00* (2013.01)

(58) Field of Classification Search
CPC .......... B21F 33/025; B21F 33/02; B21F 1/00; B21F 27/16; B21F 33/04; B21F 35/00; B68G 9/00; A47C 23/00; A47C 23/05; B23P 19/00; B23P 11/00; B27F 7/00
See application file for complete search history.

(56) References Cited

U.S. PATENT DOCUMENTS

| | | | | | | |
|---|---|---|---|---|---|---|
| 2,788,119 | A | * | 4/1957 | Sturm | B21F 33/04 | 192/139 |
| 4,625,349 | A | * | 12/1986 | Higgins | B21F 33/04 | 5/256 |
| 5,126,004 | A | * | 6/1992 | Suenens | B68G 9/00 | 156/566 |
| 5,184,802 | A | * | 2/1993 | Galumbeck | A47C 23/05 | 5/267 |

(Continued)

OTHER PUBLICATIONS

Viking website showing description of Scout accessed on Apr. 21, 2025—https://www.vikingeng.com/equipment/bedding-automation/scout.

(Continued)

*Primary Examiner* — Sarang Afzali
*Assistant Examiner* — Darrell C Ford
(74) *Attorney, Agent, or Firm* — Dinsmore & Shohl LLP

(57) ABSTRACT

A box spring assembly system includes a platform having first and second box spring receiving areas. The platform including a conveyor belt for moving a base unit and a wire grid from the first box spring receiving area to the second box spring receiving area The system including a carriage having a plurality of firing mechanisms. The box spring assembly system includes an electronic control unit configured to perform various functions, including but not limited to, determine a size of the base unit positioned within the first box spring receiving area, position the plurality of firing mechanisms based on the detected size of the base unit, instruct the firing mechanisms to secure the wire grid to the base unit, and instruct the conveyor belt to move the base unit and the wire grid from the first box spring receiving area to the second box spring receiving area.

14 Claims, 8 Drawing Sheets

(56) References Cited

U.S. PATENT DOCUMENTS

| | | | | |
|---|---|---|---|---|
| 7,490,401 | B2 * | 2/2009 | Mossbeck | A47C 23/057 227/100 |
| 11,304,535 | B2 * | 4/2022 | Myers | B21F 27/16 |
| 2006/0011696 | A1 * | 1/2006 | Mossbeck | B21F 15/04 227/150 |
| 2019/0365114 | A1 * | 12/2019 | Myers | B21F 33/04 |

OTHER PUBLICATIONS

Viking website showing description of Skute II accessed on Apr. 21, 2025—https://www.vikingeng.com/equipment/bedding-automation/skute-ii.

* cited by examiner

BOX SPRING ASSEMBLY SYSTEM

CROSS-REFERENCE TO RELATED APPLICATION

This application claims the benefit of U.S. Provisional Patent Application No. 63/638,508, filed Apr. 25, 2024, for "Box Spring Assembly System," which is hereby incorporated by reference in its entirety including the drawings.

TECHNICAL FIELD

The present specification generally relates to systems and methods for assembling box springs and, more specifically, systems and methods for assembling a box spring on a platform while permitting a second box spring to be concurrently staged for assembly on the platform.

BACKGROUND

Typically, systems for assembling a box spring are only capable of assembling a single box spring at a time. Additionally, such systems require user input to determine the size of the box spring being assembled. In response, individual components of the system may need to be adjusted to accommodate the specific box spring. Accordingly, this increases the time necessary to assembly a single box spring.

Accordingly, a need exists for improved box spring assembly systems that do not require user input and reduces time necessary for assembling box springs.

SUMMARY

In one embodiment, a box spring assembly system includes: a platform including a first box spring receiving area and a second box spring receiving area, the platform including a conveyor belt for moving a base unit and a wire grid from the first box spring receiving area to the second box spring receiving area; a carriage coupled to the platform and movable between the first box spring receiving area and the second box spring receiving area, the carriage including a plurality of firing mechanisms for securing the wire grid to the base unit; and an electronic control unit communicatively coupled to the conveyor belt and the carriage, the electronic control unit configured to: determine a size of the base unit positioned within the first box spring receiving area; position the plurality of firing mechanisms based on the detected size of the base unit; instruct the firing mechanisms to secure the wire grid to the base unit; and instruct the conveyor belt to move the base unit and the wire grid from the first box spring receiving area to the second box spring receiving area.

In another embodiment, a carriage includes: a spindle; a plurality of nuts configured to threadedly engage the spindle, each of the plurality of nuts includes: a lower nut portion; and an upper nut portion threadedly engaging the spindle, the upper nut portion being movable relative to the lower nut portion; and a plurality of firing mechanisms, wherein each of the plurality of nuts is coupled to a respective one of the plurality of firing mechanisms.

In yet another embodiment, a method includes: operating a first side guide and a second side guide from a retracted position to an extended position; determining a size of a base unit within a first box spring receiving area based on data received from the first side guide and the second side guide located within the first box spring receiving area; positioning a plurality of firing mechanisms of a carriage based on the determined size of the base unit; moving the carriage from a home position in a first direction and operating the plurality of firing mechanisms to partially secure a wire grid to the base unit; moving the carriage in a second direction opposite the first direction back to the home position; operating a conveyor belt to move the base unit and the wire grid from the first box spring receiving area into a second box spring receiving area; and moving the carriage from the home position in the first direction and operating the plurality of firing mechanisms to further secure the wire grid to the base unit.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
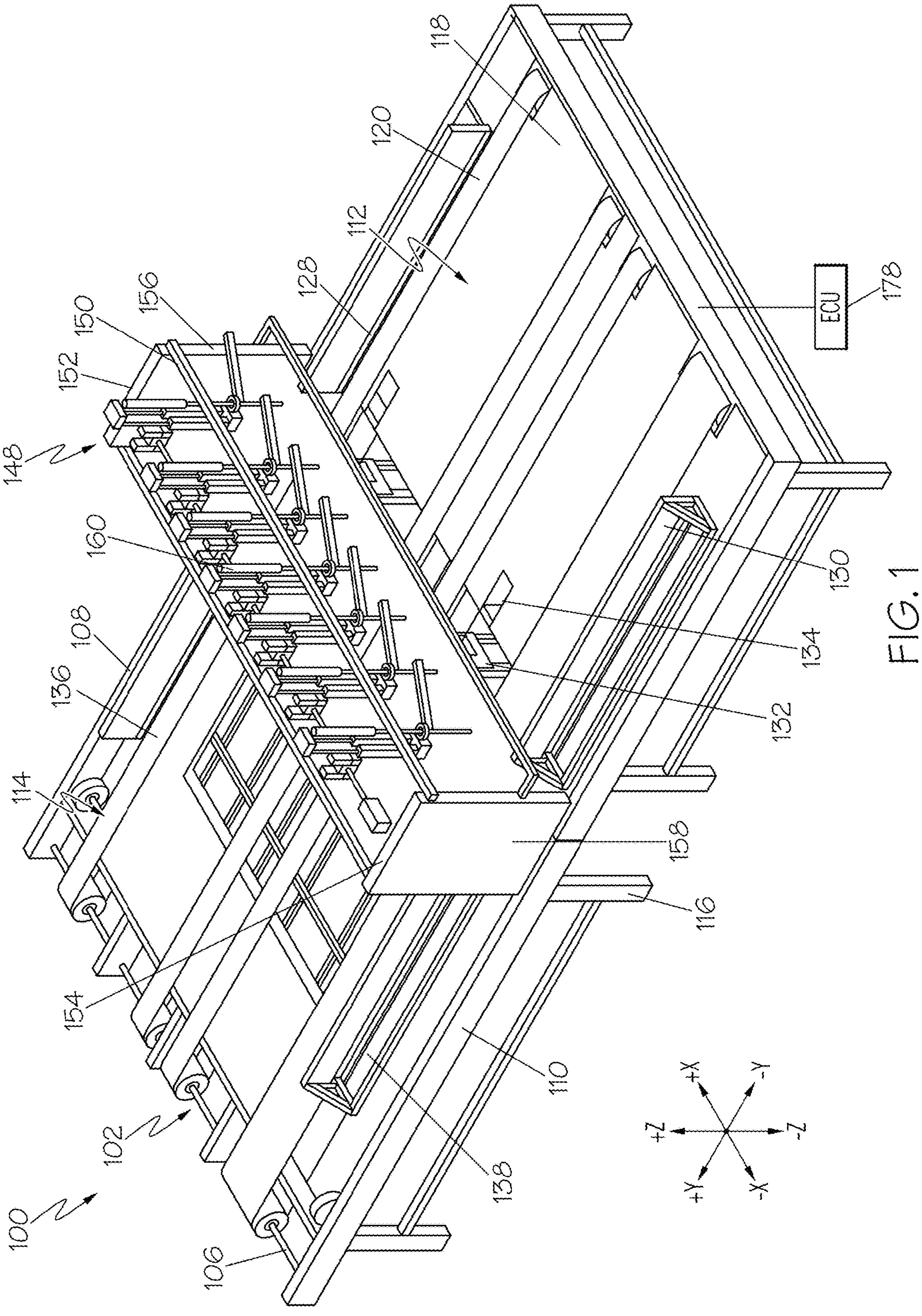
FIG. 1 depicts a perspective view of a box spring assembly system, according to one or more embodiments shown and described herein.

Embodiments described herein are directed to box spring assembly systems capable of automatically detecting a size of a box spring positioned on a platform of the box spring assembly system and assembling the box spring without user input while permitting a second box spring to be concurrently staged for assembly on the platform, thereby reducing assembly time.

The box spring assembly system includes a platform including a first box spring receiving area and a second box spring receiving area, the platform including a conveyor belt for moving a base unit and a wire grid from the first box spring receiving area to the second box spring receiving area, a carriage coupled to the platform and movable between the first box spring receiving area and the second box spring receiving area, the carriage including a plurality of firing mechanisms for securing the wire grid to the base unit, and an electronic control unit communicatively coupled to the conveyor belt and the carriage. The electronic control unit is configured to determine a size of the base unit positioned within the first box spring receiving area, position the plurality of firing mechanisms based on the detected size of the base unit, instruct the firing mechanisms to secure the wire grid to the base unit, and instruct the conveyor belt to move the base unit and the wire grid from the first box spring receiving area to the second box spring receiving area.

Various embodiments of the box spring assembly systems and the operation of the box spring assembly systems are described in more detail herein. Whenever possible, the same reference numerals will be used throughout the drawings to refer to the same or like parts.

As used herein, the term "platform longitudinal direction" refers to the forward-rearward direction of the platform (i.e., in the +/−Y direction of the coordinate axes depicted in FIG. 1). The term "platform lateral direction" refers to the cross-platform direction (i.e., in the +/−X direction of the coordinate axes depicted in FIG. 1), and is transverse to the longitudinal direction. The term "platform vertical direction" refers to the upward-downward direction of the platform (i.e., in the +/−Z direction of the coordinate axes depicted in FIG. 1). As used herein, "upper" and "above" are defined as the positive Z direction of the coordinate axes shown in the drawings. "Lower" and "below" are defined as the negative Z direction of the coordinate axes shown in the drawings.

Referring now to FIG. 1, a box spring assembly system 100 is illustrated according to one or more embodiments described herein. The box spring assembly system 100 may generally include a platform 102 having a first end 104, a second end 106 opposite the first end 104, a first side edge 108 extending between the first end 104 and the second end 106, and a second side edge 110 extending between the first end 104 and the second end 106 opposite the first side edge 108. The platform 102 defines a first box spring receiving area 112 located at the first end 104, and a second box spring receiving area 114 located at the second end 106. The platform 102 includes a plurality of legs 116 for spacing an upper surface 118 of the platform 102 off a ground surface on which the platform 102 is situated. It should be appreciated that, in embodiments, the first box spring receiving area 112 and the second box spring receiving area 114 each have a size capable of receiving a box spring ranging in size between a twin size box spring and a king size box spring.

The platform 102 further includes one or more conveyor belts 120 extending between the first end 104 and the second end 106. As shown in FIG. 1, a plurality of conveyor belts 120 extend in the platform longitudinal direction (i.e., the +/−Y direction) parallel to one another around the first end 104 and the second end 106 of the platform 102. Although the platform 102 is shown including four conveyor belts 120, it should be appreciated that any number of conveyor belts 120 may be utilized. For example, in embodiments, the platform 102 includes a single conveyor belt 120 extending around the first end 104 and the second end 106 of the platform 102. In other embodiments, the platform 102 includes two, three, four, or more than four conveyor belts 120 each extending around the first end 104 and the second end 106 of the platform 102. As described in more detail herein, the conveyor belts 120 are configured to transport a base unit 122 and a wire grid 124 (FIG. 2) positioned on top of the base unit 122 in the platform longitudinal direction across the upper surface 118 of the platform 102. The base unit 122 and the wire grid 124 define the primary components of a box spring 126 to be assembled atop the platform 102, as described in more detail herein.

The platform 102 further includes a plurality of guides that secure a position of the base unit 122 and the wire grid 124 relative to the platform 102. In embodiments, the plurality of guides includes a first side guide 128 positioned at the first side edge 108 and a second side guide 130 positioned at the second side edge 110 within the first box spring receiving area 112. The first side guide 128 and the second side guide 130 each have an elongated shape extending in the platform longitudinal direction parallel to the first side edge 108 and the second side edge 110.

The first side guide 128 and the second side guide 130 are movable between a retracted position and an extended position in the platform lateral direction toward an opposite one of the first side edge 108 and the second side edge 110. It should be appreciated that the first side guide 128 and the second side guide 130 include any suitable motorized device for facilitating movement in the platform lateral direction. For example, the first side guide 128 and the second side guide 130 may include telescoping portions extending from the first side edge 108 and the second side edge 110, respectively. In other embodiments, the first side guide 128 and the second side guide 130 may be coupled to a track extending from the first side edge 108 and the second side edge 110 along which the first side guide 128 and the second side guide 130 move. It should be appreciated that the first side guide 128 and the second side guide 130 are independently movable to contact outer side edges of the base unit 122 when in the extended position, as described in more detail herein.

In embodiments, the plurality of guides further includes one or more first end guides 132 provided at an end of the first box spring receiving area 112 opposite the first end 104 of the platform 102. As shown, a pair of first end guides 132 are provided. However, it should be appreciated that only a single first end guide 132 may be utilized. In other embodiments, more than two first end guides 132 may be provided. The first end guides 132 have an elongated shape extending in the platform lateral direction.

In embodiments, the first end guides 132 are coupled to a rail 134 extending between the first side edge 108 and the second side edge 110 of the platform 102. The first end guides 132 are movable between a retracted position and an extended position. In embodiments, the first end guides 132 translate in the platform longitudinal direction toward the first end 104 of the platform 102 when moving from the retracted position to the extended position. In other embodiments, the first end guides 132 rotate about an axis extending parallel to the platform lateral direction between the retracted position and the extended position. In such embodiments, the first end guides 132 may be configured to rotate relative to the rail 134. Alternatively, the first end guides 132 may be fixed to the rail 134, which rotates relative to the first side edge 108 and the second side edge 110.

It should be appreciated that the first end guides 132 include any suitable motorized device for facilitating movement between the retracted position and the extended position. For example, the first end guides 132 may include telescoping portions extending from the rail 134 or some other portion of the platform 102. In other embodiments, a motor may be provided for rotating the first end guides 132 relative to the rail 134 or, alternatively, rotating the rail 134 relative to the first side edge 108 and the second side edge 110.

As described in more detail herein, one or more of the first side guide 128, the second side guide 130, and the first end guides 132 may be utilized to detect a size of the box spring 126 provided within the first box spring receiving area 112. This may be determined based on a final position of the first side guide 128, the second side guide 130, and the first end guides 132 before a resistance exceeds a predetermined threshold indicating the first side guide 128, the second side guide 130, and the first end guides 132 have made contact with the box spring 126. In other embodiments, the first side guide 128, the second side guide 130, and the first end guides 132 may include one or more sensors for detecting a position of the box spring 126.

Figure 8:
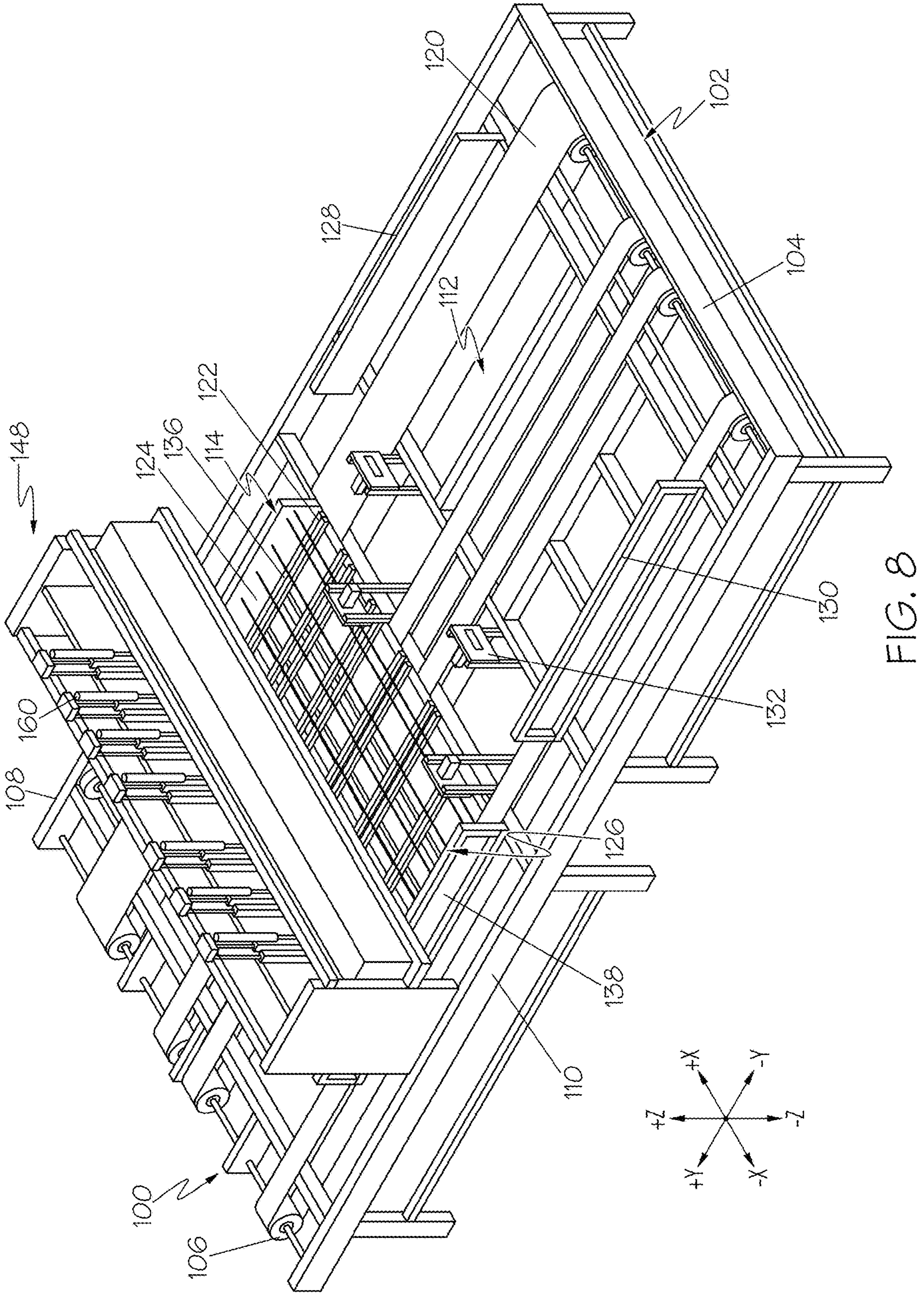
FIG. 8 depicts a perspective view of the box spring assembly system with the carriage moved in a second direction, according to one or more embodiments shown and described herein.

Similar guides may be provided within the second box spring receiving area 114 for maintaining a position of the box spring 126 within the second box spring receiving area 114. As shown in FIG. 1, a third side guide 136 and a fourth side guide 138 are provided at the first side edge 108 and the second side edge 110, respectively, within the second box spring receiving area 114. The third side guide 136 and the fourth side guide 138 are similar to the first side guide 128 and the second side guide 130 described herein. Accordingly, description of the third side guide 136 and the fourth side guide 138 is not provided herein for purposes of brevity. It should be appreciated that one or more second end guides, as shown in FIG. 8, may also be provided within the second box spring receiving area 114 similar to the first end guides 132 described herein. Accordingly, description of the second end guide is not provided herein for purposes of brevity.

Figure 2:
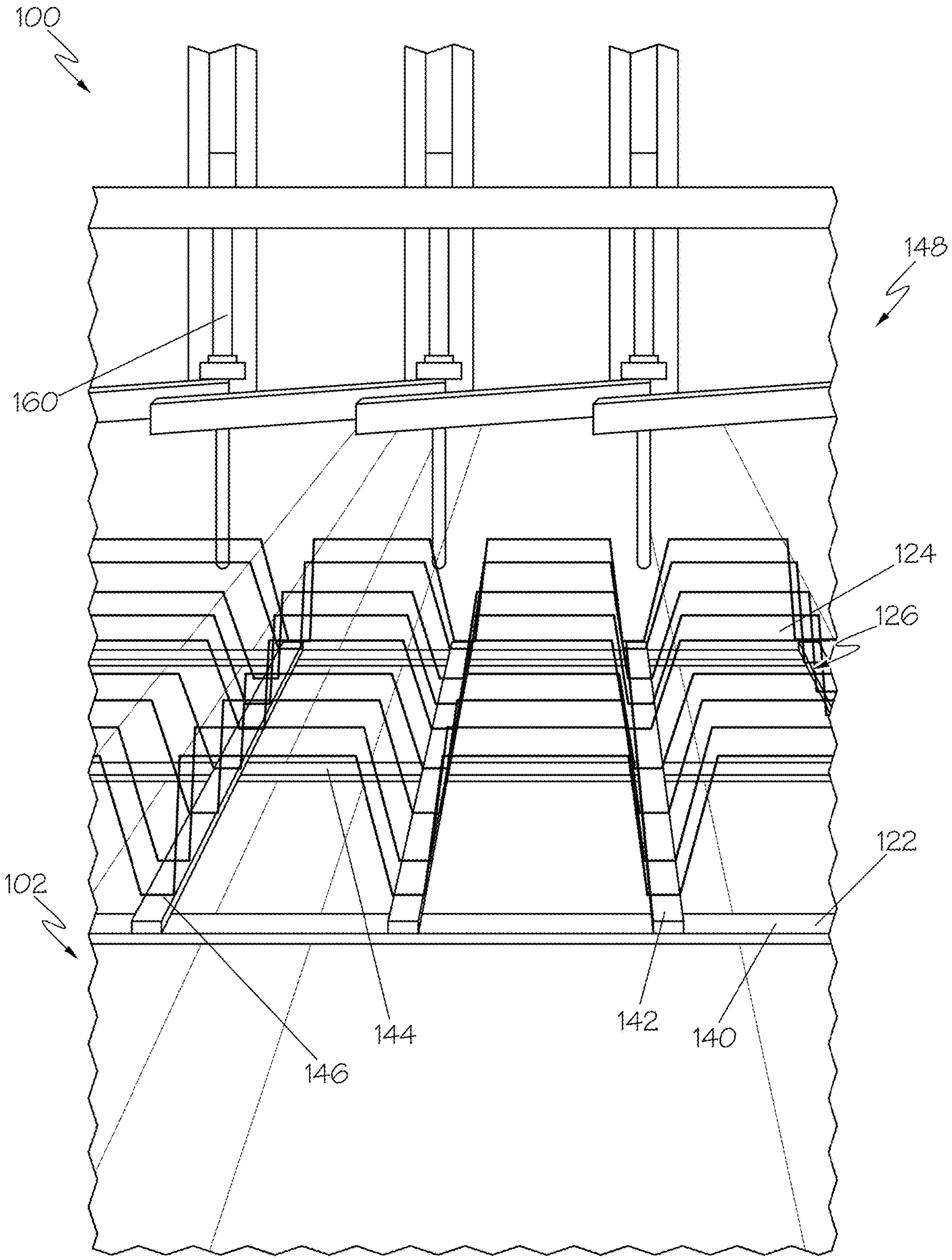
FIG. 2 depicts a partial perspective view of a base unit and a wire grid positioned on a platform of the box spring assembly system, according to one or more embodiments shown and described herein.

Referring now to FIG. 2, the base unit 122 is shown positioned on the conveyor belts 120 of the platform 102 with the wire grid 124 on top of the base unit 122. The base unit 122 includes a perimeter member 140, a plurality of longitudinal slats 142 extending across the perimeter member 140 in the platform longitudinal direction, and one or more lateral slats 144 extending across the perimeter member 140 in the platform lateral direction. In embodiments, the base unit 122 is formed from wood. However, it should be appreciated that the base unit 122 may be formed from any suitable material such as, for example, plastic or the like. The wire grid 124 is positioned on top of the base unit 122. The wire grid 124 includes a plurality of recessed portions 146 each defining contact points contacting the plurality of longitudinal slats 142 of the base unit 122. In embodiments, the wire grid 124 is formed from metal. However, it should be appreciated that the wire grid 124 may be formed from any suitable material such as, for example, plastic or the like. As described in more detail herein, the contact points of the wire grid 124 are secured to the longitudinal slats 142 by staples or the like to form the assembled box spring 126. In embodiments, the wire grid 124 has a width and a length less than a width and a length of the base unit 122. For example, the width and the length of the wire grid 124 is at least ½ inch less than the width and the length of the base unit 122.

Referring again to FIG. 1, the box spring assembly system 100 includes a carriage 148 movable along the first side edge 108 and the second side edge 110 in the platform longitudinal direction. The carriage 148 generally includes an upper wall 150 having a first end 152 and a second end 154 opposite the first end 152, a first end wall 156 extending from the first end 152 of the upper wall 150, and a second end wall 158 extending from the second end 154 of the upper wall 150. The carriage 148 further includes a plurality of firing mechanisms 160 coupled to the upper wall 150 and spaced apart from one another between the first end wall 156 and the second end wall 158. As described in more detail herein, the firing mechanisms 160 are movably controlled between a loading position and a firing position, as shown in FIG. 1. In the loading position, the firing mechanism 160 are moved to be located closer to one another and at either the first end wall 156 or the second end wall 158 of the carriage 148. In embodiments, the firing mechanisms 160 may be pneumatically powered.

As shown in FIG. 1, the carriage 148 is in a home position located between the first box spring receiving area 112 and the second box spring receiving area 114. However, the carriage 148 is positionable into a plurality of additional positions by moving the carriage 148 between the first end 104 and the second end 106 of the platform 102 in the platform longitudinal direction, as described in more detail herein. The carriage 148 is movable along the platform 102 using any suitable motorized device. In embodiments, the carriage 148 includes a plurality of rollers that engage a track provided on the first side edge 108 and the second side edge 110. In other embodiments, the carriage 148 includes the track and the first side edge 108 and the second side edge 110 include the plurality of rollers engaging the track. In other embodiments, a ball screw may be provided at opposite end walls 156, 158 of the carriage 148 to permit movement of the carriage 148 in the platform longitudinal direction.

Figure 3:
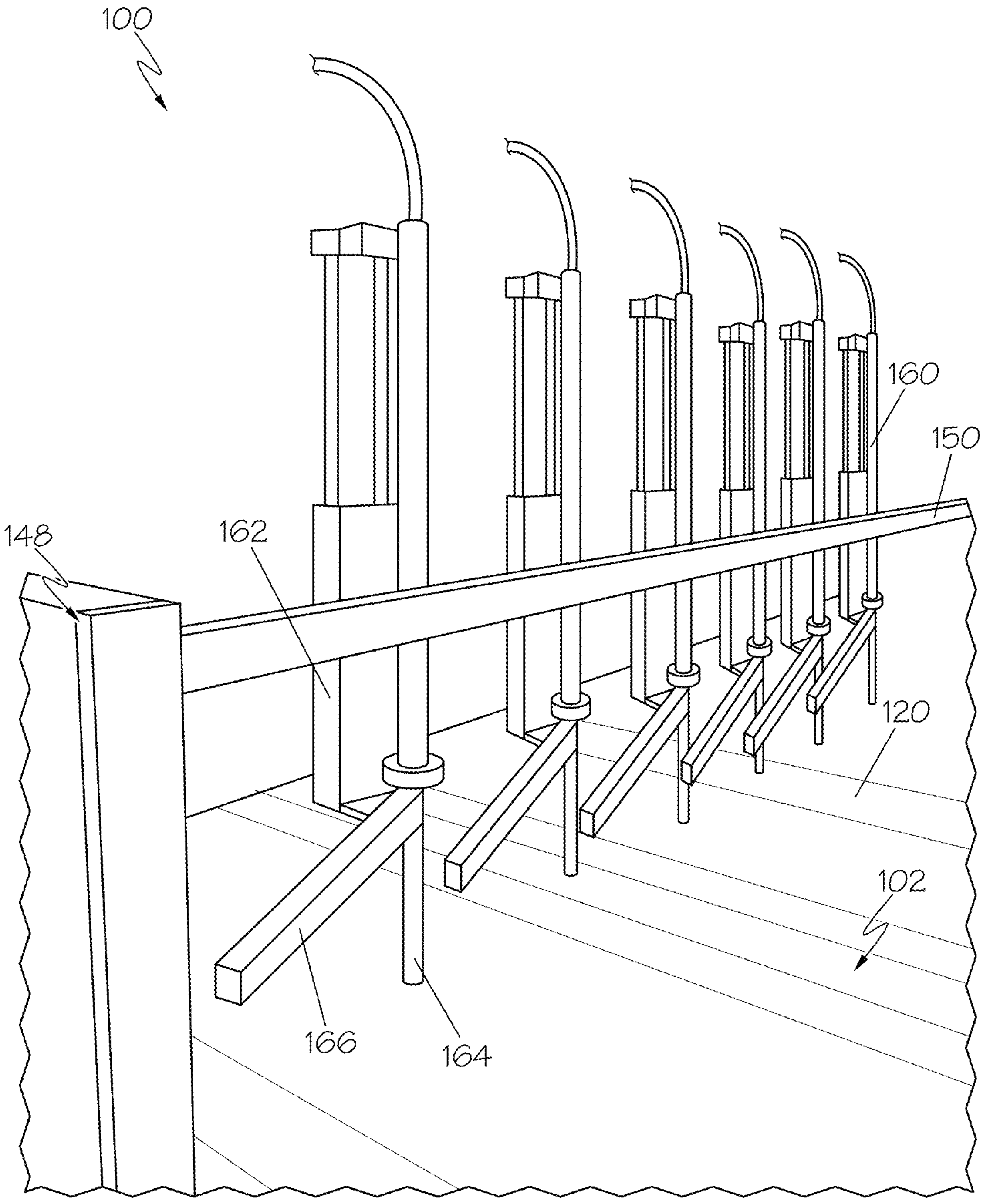
FIG. 3 depicts a perspective view of a carriage positioned on the platform of the box spring assembly system, according to one or more embodiments shown and described herein.

Referring now to FIG. 3, a portion of the carriage 148 is shown in more detail. As shown, the carriage 148 includes seven firing mechanisms 160. However, it should be appreciated that the carriage 148 may include any number of firing mechanisms 160 based on the size of the box spring being assembled. Each firing mechanism 160 includes a fixing portion 162 coupled to the upper wall 150, a dispensing portion 164 extending from an end of the fixing portion 162, and a cartridge holder 166. In the loading position, the cartridge holder 166 is configured to receive a cartridge of fastening members such as, for example, staples, which may be dispensed through the dispensing portion 164 to secure the wire grid 124 to the base unit 122.

Figure 4:
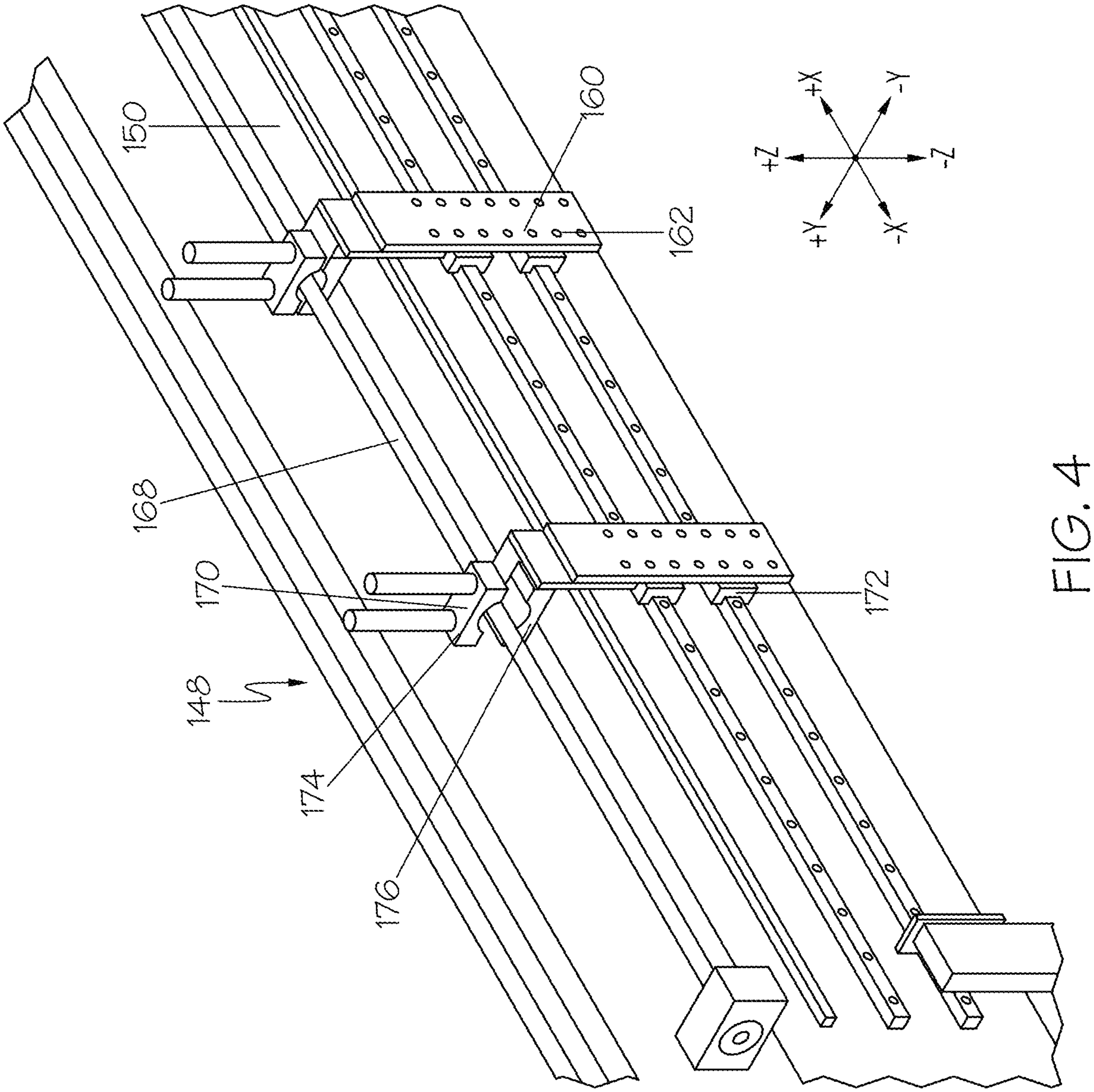
FIG. 4 depicts a partial perspective view of the carriage including a pair of firing mechanisms, according to one or more embodiments shown and described herein.

Referring now to FIG. 4, a portion of the upper wall 150 of the carriage 148 is shown including a spindle 168 for positioning the firing mechanisms 160 into their particular position based on a determined size of the box spring 126. In FIG. 4, only a partial view of the fixing portion 162 of a pair of firing mechanisms 160 are illustrated. With more particularity, each firing mechanism 160 includes a nut 170 threadedly engaging the spindle 168. In embodiments, the fixing portion 162 of each firing mechanism 160 includes one or more protrusions 172 engaging the upper wall 150 of the carriage 148. Accordingly, rotation of the spindle 168, which engages the nut 170 of each firing mechanism 160, results in linear movement of the firing mechanisms 160 in the platform lateral direction along the upper wall 150 of the carriage 148. The nut 170 includes an upper nut portion 174 and a lower nut portion 176 movable relative to one another. In embodiments, only the upper nut portion 174 threadedly engages the spindle 168 and the upper nut portion 174 is movable relative to the lower nut portion 176 to disengage the spindle 168. Accordingly, once the upper nut portion 174 disengages the spindle 168, linear movement of the firing mechanism 160 is discontinued. In other embodiments, the lower nut portion 176 threadedly engages the spindle 168 and is movable relative to the upper nut portion 174 to disengage the spindle 168 and prevent additional linear movement of the respective firing mechanism 160. However, it should be appreciated that the firing mechanisms 160 may be positioned in any other suitable matter other than that depicted herein. It should be appreciated that each firing mechanism 160, and particularly the nut 170 of each firing mechanism 160, may be independently operated to control a position of each of the firing mechanisms 160.

Referring again to FIG. 1, in embodiments, the box spring assembly system 100 may include an electronic control unit 178 communicatively coupled to the conveyor belts 120 for controlling operation of the conveyor belts 120 to translate a box spring positioned on the platform 102 from the first box spring receiving area 112 and the second box spring receiving area 114. The electronic control unit 178 may additionally be communicatively coupled to the plurality of guides 128, 130, 132, 136, 138 for controlling operation of each of the guides 128, 130, 132, 136, 138 between the retracted position and the extended position. Additionally, the electronic control unit 178 may be configured to receive data from each of the guides 128, 130, 132, 136, 138 to detect a size of the box spring positioned on the platform 102 within the first box spring receiving area 112 or the second box spring receiving area 114. Additionally, the electronic control unit 178 may be communicatively coupled to the carriage 148 for controlling a position of the carriage 148 and operation of the individual firing mechanisms 160.

The electronic control unit 178 includes one or more processors and one or more memory modules. Each of the one or more processors may be any device capable of executing machine readable and executable instructions. Accordingly, each of the one or more processors may be a controller, an integrated circuit, a microchip, a computer, or any other computing device. The one or more processors are coupled to a communication path that provides signal interconnectivity between various modules of the box spring assembly system. Accordingly, the communication path may communicatively couple any number of processors with one another, and allow the modules coupled to the communication path to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path may be formed from any medium that is capable of transmitting a signal such as, for example, conductive wires, conductive traces, optical waveguides, or the like. In some embodiments, the communication path may facilitate the transmission of wireless signals, such as WiFi, Bluetooth®, Near Field Communication (NFC) and the like. Moreover, the communication path may be formed from a combination of mediums capable of transmitting signals. In one embodiment, the communication path comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the electronic control unit 178 includes one or more memory modules coupled to the communication path. The one or more memory modules may comprise RAM, ROM, flash memories, hard drives, or any device capable of storing machine readable and executable instructions such that the machine readable and executable instructions can be accessed by the one or more processors. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Figure 5:
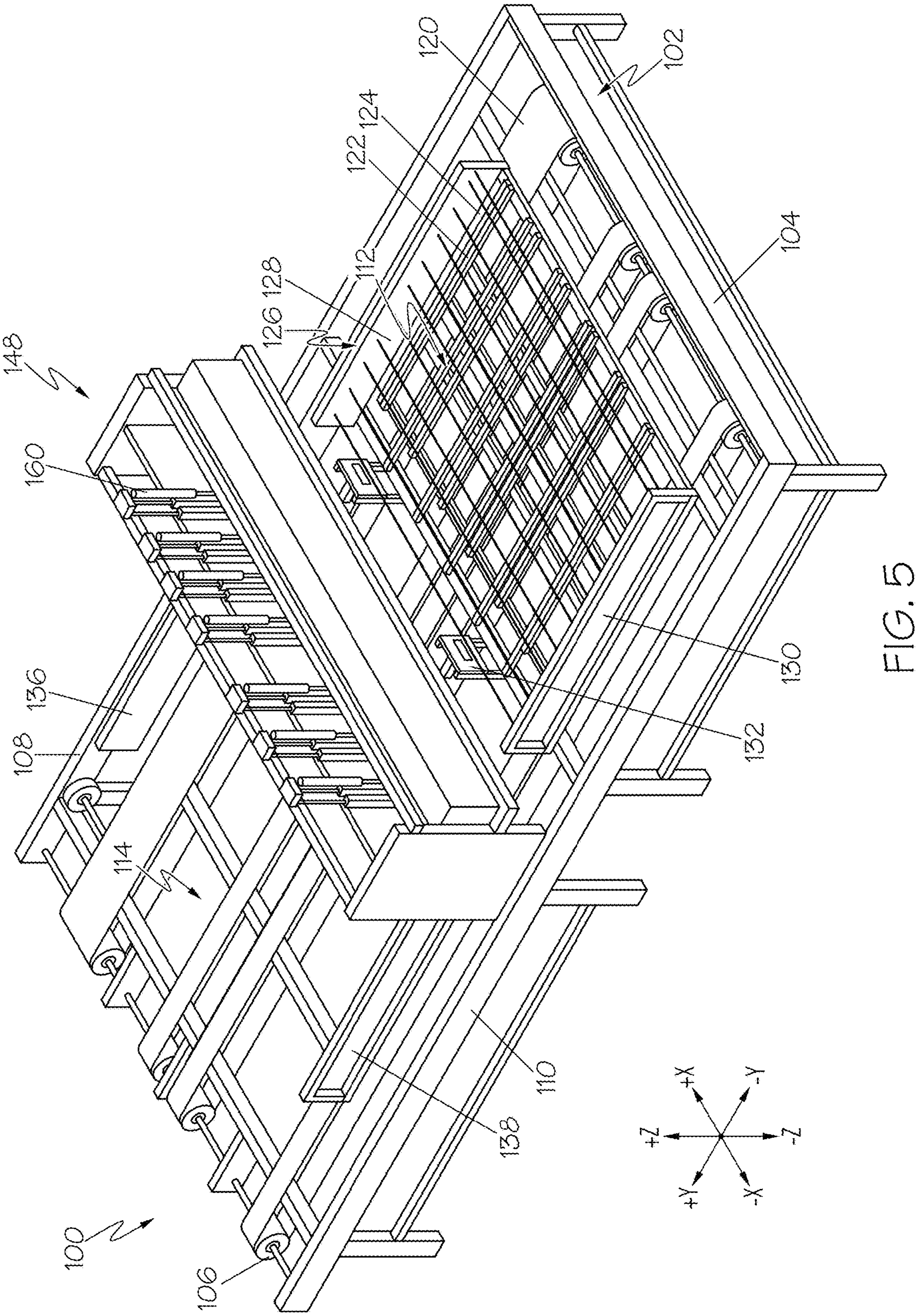
FIG. 5 depicts a perspective view of the box spring assembly system with the carriage in a home position and the base unit positioned in a first box spring receiving area of the platform, according to one or more embodiments shown and described herein.

Referring now to FIGS. 5-8, a method of operating the box spring assembly system 100 will be described in more detail. Initially, the box spring assembly system 100 is in a starting state with the carriage 148 located in the home position, as shown in FIG. 5. As shown, the firing mechanisms 160 are in the firing position spaced apart from one another in the platform lateral direction. However, in the starting state, the firing mechanisms 160 may be in the loading position such that fastening members, such as staples, may be permitted to be loaded into each of the firing mechanisms 160. Additionally, in the starting state, the guides 128, 130, 132, 136, 138 are in the retracted position. However, as shown in FIG. 5, the guides 128, 130, 132 within the first box spring receiving area 112 are in the extended position and abutting against the base unit 122 and the wire grid 124 positioned on top of the conveyor belts 120 within the first box spring receiving area 112. As described herein, with the guides 128, 130, 132 within the first box spring receiving area 112 moved into the extended position, a size of the base unit 122 may be determined by the electronic control unit 178 based on data received from the guides 128, 130, 132. Thus, the electronic control unit 178 is operated to appropriately position the firing mechanisms 160 based on the determined size of the base unit 122. In embodiments, the conveyor belt 120 is operated to move the base unit 122 and the wire grid 124 toward the guide 132 to abut the guide 132.

Figure 6:
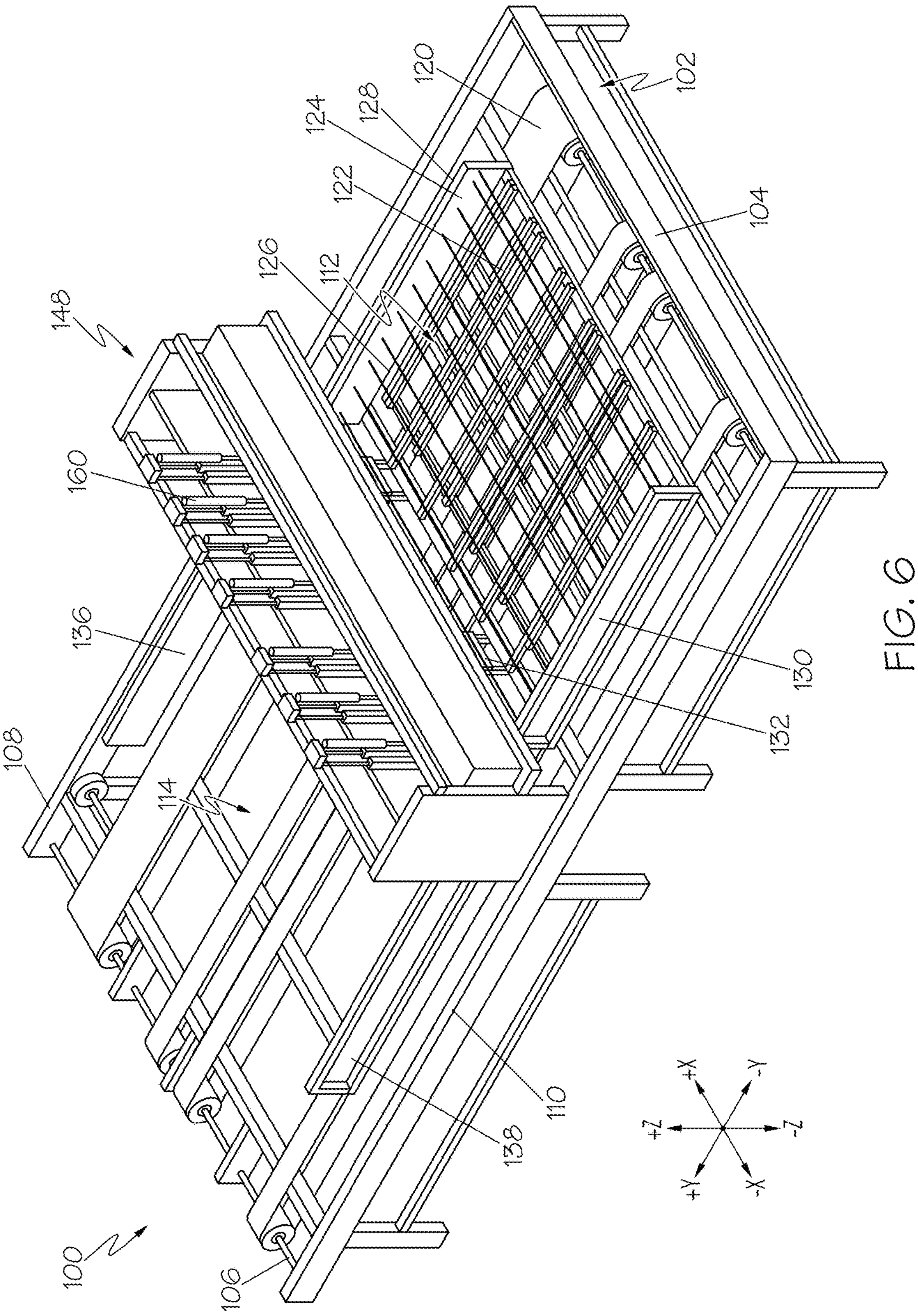
FIG. 6 depicts a perspective view of the box spring assembly system with the carriage moved in a first direction, according to one or more embodiments shown and described herein.

As shown in FIG. 6, once the firing mechanisms 160 are positioned along the carriage 148 in the platform lateral direction based on the determined size of the base unit 122, the carriage 148 is moved a first distance in a first firstion toward the first end 104 of the platform 102. Thereafter, once in position, as shown in FIG. 6, the firing mechanisms 160 are operated to fire staples, or any other suitable fastening members, to secure a first end of the wire grid 124 to a first end of the base unit 122. The staples are inserted into the wire grid 124 and the base unit 122 at an angle. In embodiments, the angle at which the staples are inserted is equal to or greater than 10 degrees and less than or equal to 30 degrees. In embodiments, the angle at which the staples are inserted is equal to or greater than 20 degrees and less than or equal to 25 degrees.

Figure 7:
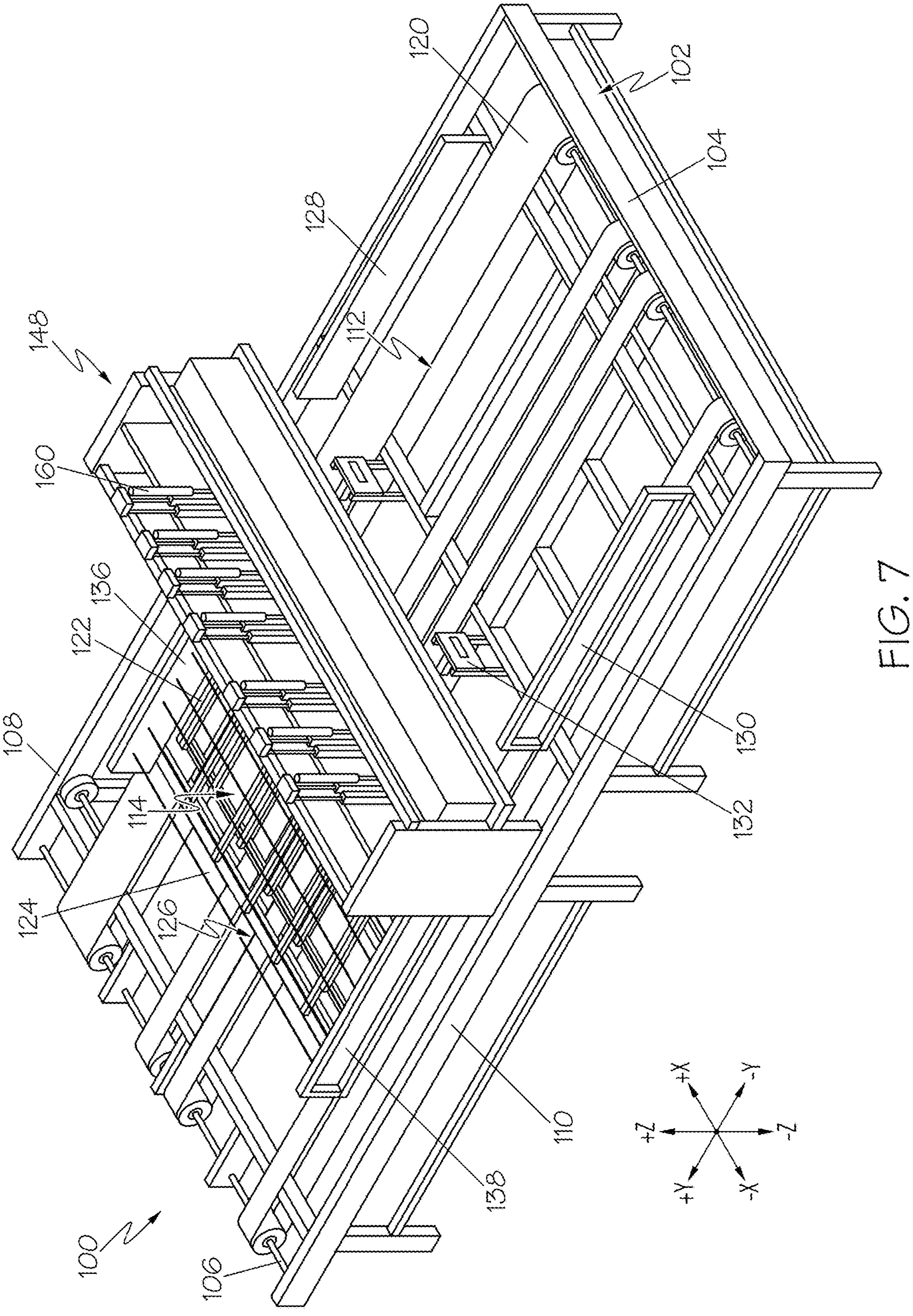
FIG. 7 depicts a perspective view of the box spring assembly system with the carriage in the home position and the base unit positioned in a second box spring receiving area of the platform, according to one or more embodiments shown and described herein.

Once the first end of the wire grid 124 is secured to the first end of the base unit 122, the electronic control unit 178 is operated to move the carriage 148 back to the home position, position the guides 128, 130, 132 back into the retracted position, and operate the conveyor belts 120 to move the base unit 122 and the partially attached wire grid 124 into the second box spring receiving area 114, as shown in FIG. 7. The electronic control unit 178 is configured to operate the conveyor belts 120 for a predetermined period of time such that the base unit 122 is appropriately positioned within the second box spring receiving area 114 and not over extended past the second end 106 of the platform 102. As shown in FIG. 7, once the base unit 122 is positioned within the second box spring receiving area 114, the guides 136, 138 within the second box spring receiving area 114 are positioned into the extended position to maintain a position of the base unit 122. In embodiments, the conveyor belt 120 is operated in a reverse direction to move the base unit 122 and the wire grid 124 toward the second end guide at the center of the platform 102 to abut the second end guide.

Thereafter, as shown in FIG. 8, the electronic control unit 178 operates the carriage 148 to move a second distance from the home position in a second direction opposite the first direction toward the second end 106 of the platform 102. As the carriage 148 moves in the second direction toward the second end 106 of the platform 102, the electronic control unit 178 intermittently operates the firing mechanisms 160 to further secure the wire grid 124 to the base unit 122. As the carriage 148 is moved in the second direction to complete the securement of the wire grid 124 to the base unit 122, in embodiments, the second distance is greater than the first distance. In other embodiments, the first distance moved in the first direction may be equal to the second distance in the second direction. In other embodiments, the first distance and the second distance may be equal to one another. It should be appreciated that while the carriage 148 is being operated as shown in FIG. 8, a second base unit and a second wire grid may be positioned within the first box spring receiving area 112. Thus, the above steps may be repeated, as shown in FIGS. 5 and 6 to partially secure the second wire grid to the second base unit while the base unit 122 and the wire grid 124 are removed from the platform 102. Accordingly, this allows for one box spring to be assembled while permitting a second box spring to be concurrently staged for assembly, thereby reducing wasted time between assembly of each box spring. In embodiments in which a second box spring is staged for assembly within the first box spring receiving area 112, the guides 128, 130, 132 are utilized to determine a size of the second box spring and appropriately position the firing mechanisms 160.

From the above, it is to be appreciated that defined herein is a box spring assembly system capable of automatically detecting a size of a box spring positioned on a platform of the box spring assembly system and assembling a box spring without user input, while permitting a second box spring to be staged for assembly, thereby reducing assembly time. The box spring assembly system includes an electronic control unit configured to determine a size of a base unit positioned within a first box spring receiving area, position a plurality of firing mechanisms based on the detected size of the base unit instruct the firing mechanisms to secure a wire grid to the base unit, and instruct a conveyor belt to move the base unit and the wire grid from the first box spring receiving area to a second box spring receiving area.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A box spring assembly system comprising:

a platform including a first box spring receiving area and a second box spring receiving area, the platform including a conveyor belt for moving a base unit and a wire grid from the first box spring receiving area to the second box spring receiving area;

a carriage coupled to the platform and movable between the first box spring receiving area and the second box spring receiving area, the carriage including a plurality of firing mechanisms for securing the wire grid to the base unit, wherein the carriage comprises:

a spindle; and a plurality of nuts threadedly engaging the spindle and spaced apart from one another, each of the plurality of nuts being coupled to a respective one of the plurality of firing mechanisms; and an electronic control unit communicatively coupled to the conveyor belt and the carriage, the electronic control unit configured to:

determine a size of the base unit positioned within the first box spring receiving area;

position the plurality of firing mechanisms based on the size of the base unit;

instruct the firing mechanisms to secure the wire grid to the base unit; and instruct the conveyor belt to move the base unit and the wire grid from the first box spring receiving area to the second box spring receiving area.

2. The box spring assembly system of claim 1, further comprising:

a first side guide positioned within the first box spring receiving area and extending parallel to a first side edge of the platform, the first side guide movable between a retracted position and an extended position;

a second side guide positioned within the first box spring receiving area and extending parallel to a second side edge of the platform opposite the first side edge, the second side guide movable between a retracted position and an extended position; and a first end guide positioned within the first box spring receiving area and extending parallel to a first end of the platform, the first end guide movable between a retracted position and an extended position.

3. The box spring assembly system of claim 2, wherein the first end guide includes a pair of first end guides spaced apart from one another along a platform lateral direction extending parallel to the first end of the platform.

4. The box spring assembly system of claim 2, wherein the electronic control unit is configured to:

receive data from the first side guide, the second side guide, and the first end guide; and determine the size of the base unit based on the data received from the first side guide, the second side guide, and the first end guide.

5. The box spring assembly system of claim 2, further comprising:

a third side guide positioned within the second box spring receiving area and extending parallel to the first side edge of the platform, the third side guide movable between a retracted position and an extended position;

a fourth side guide positioned within the second box spring receiving area and extending parallel to the second side edge of the platform opposite the first side edge, the fourth side guide movable between a retracted position and an extended position; and a second end guide positioned within the second box spring receiving area and extending parallel to a second end of the platform, the second end guide movable between a retracted position and an extended position, wherein the third side guide, the fourth side guide, and the second end guide abut against the base unit when in the extended position and the base unit is in the second box spring receiving area.

6. The box spring assembly system of claim 5, wherein the second end guide includes a pair of second end guides spaced apart from one another along a platform lateral direction extending parallel to the second end of the platform.

7. The box spring assembly system of claim 2, wherein the size of the base unit positioned within the first box spring receiving area is determined by the electronic control unit based on data received from the first side guide, the second side guide, and the first end guide.

8. The box spring assembly system of claim 1, wherein each of the plurality of nuts comprises:

a lower nut portion; and an upper nut portion threadedly engaging the spindle, the upper nut portion being movable relative to the lower nut portion.

9. The box spring assembly system of claim 8, wherein the electronic control unit is configured to selectively instruct the upper nut portion of each of the plurality of nuts to disengage the spindle to discontinue movement of the respective firing mechanism along the spindle.

10. A method comprising:

operating a first side guide and a second side guide from a retracted position to an extended position;

determining a size of a base unit within a first box spring receiving area based on data received from the first side guide and the second side guide located within the first box spring receiving area;

positioning a plurality of firing mechanisms of a carriage based on the determined size of the base unit, wherein the carriage comprises:

a spindle; and a plurality of nuts threadedly engaging the spindle and spaced apart from one another, each of the plurality of nuts being coupled to a respective one of the plurality of firing mechanisms;

moving the carriage from a home position in a first direction and operating the plurality of firing mechanisms to partially secure a wire grid to the base unit;

moving the carriage in a second direction opposite the first direction back to the home position;

operating a conveyor belt to move the base unit and the wire grid from the first box spring receiving area into a second box spring receiving area; and moving the carriage from the home position in the first direction and operating the plurality of firing mechanisms to further secure the wire grid to the base unit.

11. The method of claim 10, wherein:

each of the plurality of nuts comprises:

a lower nut portion; and an upper nut portion threadedly engaging the spindle, the upper nut portion being movable relative to the lower nut portion.

12. The method of claim 11, wherein:

positioning the plurality of firing mechanisms comprises selectively instructing the upper nut portion of each of the plurality of nuts to disengage the spindle to discontinue movement of the respective firing mechanism along the spindle.

13. The method of claim 10, wherein a first distance the carriage moves in the first direction is less than a second distance the carriage moves in the second direction.

14. The method of claim 10, further comprising operating a third side guide and a fourth side guide from a retracted position to an extended position to maintain a position of the wire grid and the base unit within the second box spring receiving area.

* * * * *